United States Patent

Bomse

[19]

[11] Patent Number: 5,973,782
[45] Date of Patent: Oct. 26, 1999

[54] PHASELESS WAVELENGTH MODULATION SPECTROSCOPY

[75] Inventor: David S. Bomse, Santa Fe, N.Mex.

[73] Assignee: Southwest Sciences Incorporated, N.Mex.

[21] Appl. No.: 09/005,356

[22] Filed: Jan. 9, 1998

Related U.S. Application Data

[60] Provisional application No. 60/035,038, Jan. 9, 1997, and provisional application No. 60/037,395, Feb. 6, 1997.

[51] Int. Cl.$^6$ ..................................................... G01B 9/02
[52] U.S. Cl. ........................................... 356/346; 356/345
[58] Field of Search ..................................... 356/346, 345

[56] References Cited

U.S. PATENT DOCUMENTS

| | | |
|---|---|---|
| 4,934,816 | 6/1990 | Silver et al. . |
| 5,015,848 | 5/1991 | Bomse et al. . |
| 5,047,639 | 9/1991 | Wong . |
| 5,267,019 | 11/1993 | Whittaker et al. . |
| 5,491,341 | 2/1996 | McCaul . |
| 5,491,344 | 2/1996 | Kenny et al. . |
| 5,528,040 | 6/1996 | Lehmann . |
| 5,572,031 | 11/1996 | Cooper et al. ........................... 250/343 |

Primary Examiner—Robert H. Kim
Assistant Examiner—Andrew H. Lee
Attorney, Agent, or Firm—Jeffrey D. Myers

[57] ABSTRACT

An improvement to wavelength modulation spectroscopy systems operating at frequency $\Omega$ and having a photodetector generating output with frequency components $\Omega$, $2\Omega$, ... $n\Omega$, where n is an integer greater than one, the improvement comprising a demodulator operating at frequency $\Omega+\delta$, where $\Omega>>\delta$, and additionally recovering signals at $n\Omega+n\delta$. The system provides information on multiple detection harmonics simultaneously, no phase adjustment is needed, and the system uses a heterodyne demodulation with its inherent low-noise advantage.

22 Claims, 6 Drawing Sheets

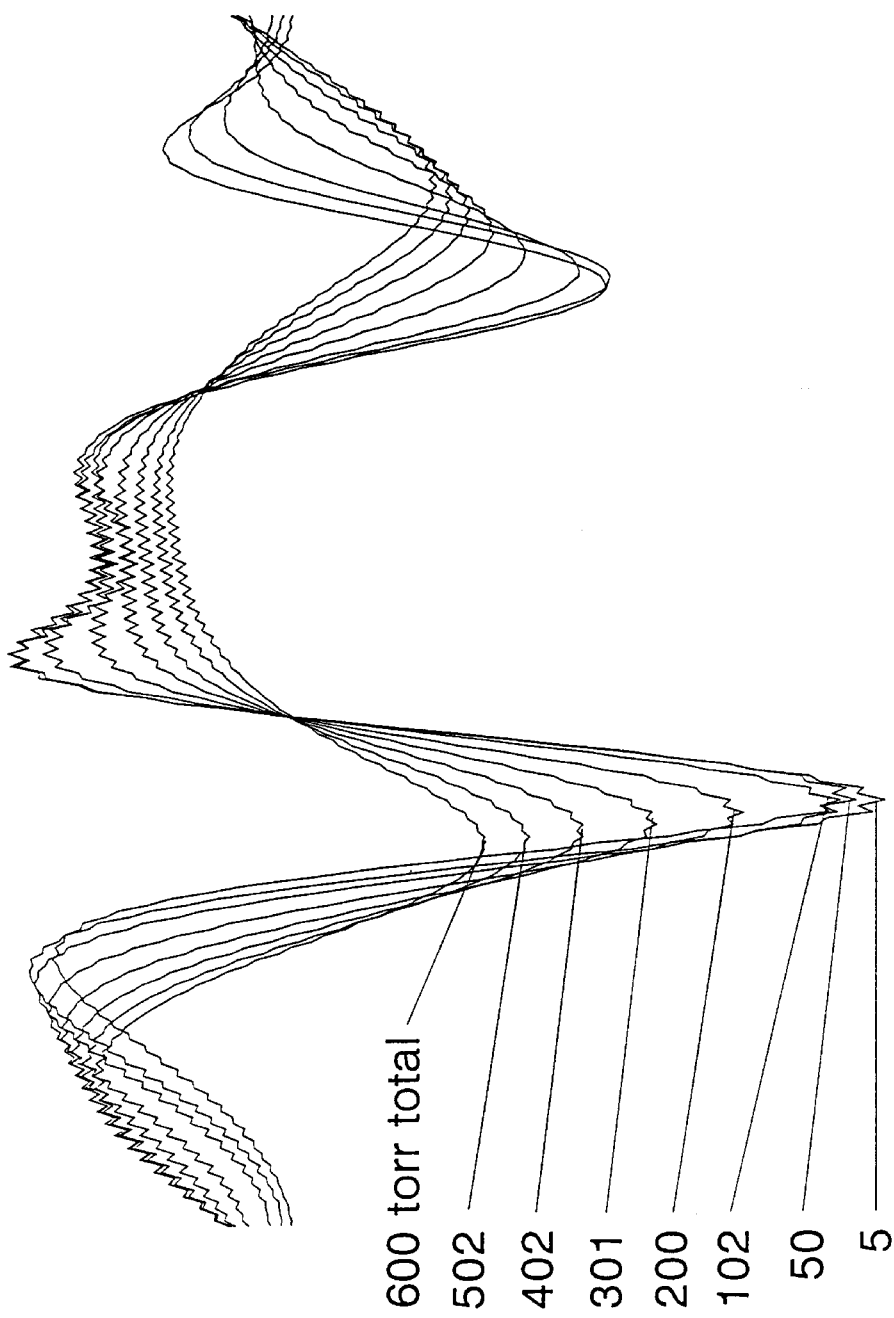

PHASELESS WAVELENGTH MODULATION SPECTROSCOPY

CROSS-REFERENCE TO RELATED APPLICATIONS

This application claims the benefit of the filing of U.S. Provisional Patent Applications Ser. Nos. 60/035,038 and 60/037,395, entitled "Wavelength Modulation Spectroscopy with Multiple, Phaseless Detection", filed on Jan. 9, 1997, and Feb. 6, 1997, respectively, and the specifications thereof are incorporated herein by reference.

GOVERNMENT RIGHTS

The U.S. Government has a paid-up license in this invention and the right in limited circumstances to require the patent owner to license others on reasonable terms as provided for by the terms of Contract Nos. 50-DKNB-6-90125 and 50-DKNB-7-90149 awarded by the U.S. Department of Commerce.

BACKGROUND OF THE INVENTION

1. Field of the Invention (Technical Field)

The present invention relates to an improvement to wavelength modulation spectroscopy.

2. Background Art

Wavelength modulation spectroscopy (WMS) is a form of optical absorption spectroscopy that allows detection of small optical absorbances. The technique is effective because absorption measurements are shifted from frequencies near DC, where light sources are noisy, to high frequencies where shot-noise-limited absorption measurements are possible. This shift in detection band can improve measurement sensitivity by three to five orders of magnitude.

WMS is usually implemented with continuously tunable lasers such as diode lasers. Typically, the wavelength of the light source is modulated by a small amount about an absorption feature of the target species. The modulation frequency is $\Omega$. As the light beam propagates through a sample, absorption by the target species converts some of the wavelength modulation into amplitude modulation (AM) of the light. When the light impinges onto a photodetector such as a photodiode, the output signal from the detector contains AC components at the modulation frequency, $\Omega$, and its higher harmonics, $2\Omega$, $3\Omega$, $4\Omega$, etc. One of the AC components is selected for measurement using a phase sensitive detector such as a lock-in amplifier or a mixer. This signal processing step is known as demodulation and the signal obtained by demodulation at frequency $n\Omega$ is known as the nf signal. Usually a portion of the modulation waveform is used to generate a reference waveform (local oscillator) for the demodulator. The demodulated signal is related to the optical absorbance and to the intensity of the light beam.

Detailed theory describing WMS and the relationships between the absorption lineshape and demodulated lineshapes is given by Silver, "Frequency-modulation spectroscopy for trace species detection: theory and comparison among experimental methods," *Applied Optics* 31, 707–717 (1992). In qualitative terms, the waveform produced by slowly stepping the average laser wavelength across an absorption line while demodulating at frequency $n\Omega$ looks like the nth derivative of the absorption lineshape.

The shape of a wavelength modulated spectrum depends strongly on the ratio of the extent of the wavelength modulation to the linewidth of the absorption feature. Any phenomenon that changes the absorber linewidth, such as variations in sample pressure or, to a lesser extent, variations in sample temperature, will change the shape and peak intensities of the corresponding wavelength modulation spectrum. Changes in absorber linewidth can, therefore, introduce error into quantitative applications of WMS. The present invention provides method and apparatus that improve WMS by reducing the measurement uncertainty resulting from such changes.

A number of methods exist that can be used to correct wavelength modulation spectra for changes in the absorber linewidth; each of these approaches, however, has some substantial limitation. For example, Wilson, "Modulation broadening of NMR and ESR line shapes," *J. Appl. Phys.* 34, 3276–3285 (1963), showed that the exact shape of a wavelength modulation spectrum ran be used to extract the absorber linewidth and, thereby, calculate the actual optical absorbance and the species concentration. Wilson's method, however, requires large signal-to-noise ratios in the WMS measurements in order to obtain accurate linewidths, absorbances, and species concentrations.

Goldstein, et al., have developed an improvement to wavelength modulation spectroscopy in which the detector signal at twice the modulation frequency ($2f$) is monitored while the extent of the wavelength modulation is changed. Goldstein, et al., "Gaseous Species Absorption Monitor," U.S. Pat. No. 5,026,991; and Goldstein, et al., "Measurement of molecular concentrations and line parameters using line-locked second harmonic spectroscopy with an AlGaAs diode laser," *Appl. Opt.* 31, 3409–3415 (1992). The response of the $2f$ signal is representative of the shape and width of the absorption line. Goldstein, et al.'s invention is simple to implement since it requires only a minor modification to standard WMS instrumentation. The most significant limitation of the invention, however, arises because lasers often respond non-linearly to applied modulation waveforms. Both the extent (depth) of modulation and the time dependence of the output wavelength may not track well the changes in the applied modulation signal. Proper implementation of the invention may require careful calibration of the response of each laser or using customized (i.e., non-sinusoidal) modulation waveforms. The non-linearities are particularly important when relatively large wavelength excursions are needed, such as occur for detecting absorbances from samples at atmospheric or higher pressure or from samples at high temperatures.

Species concentrations inferred from wavelength modulation spectra can be corrected by measuring sample temperature and pressure, and using corrections calculated from basic theory or from tabulated calibrations. The computational approach can be slow, however, and requires a significant amount of computing power, tabulating a set of corrections requires a lengthy and tedious calibration. In both cases, the instrument is made more complex and more expensive by adding pressure and temperature sensors.

Some of the demodulation and signal processing techniques employed by the present invention are known in the field of phase fluorometry. Berndt et al., "Fluorometry method and apparatus using a semiconductor laser diode as a light source," U.S. Pat. No. 5,196,709; Lakowicz et al., "Method and apparatus for multi-dimensional phase fluorescence lifetime imaging," U.S. Pat. No. 5,485,530; and Thompson et al., "Phase fluorometry using a continuously modulated laser diode," *Anal. Chem.* 64, 2075–2078 (1992). Demodulation of high frequency signals makes possible measurement of the phase lag, or time delay, between excitation of a fluorophore and fluorescence emission. These measurements can be used to determine fluorescence lifetimes, including deconvolution of multiple exponential decay rates (lifetimes). Phase fluorometry differs significantly from the present invention in several key ways: 1) the present invention measures optical absorption, not fluorescence; 2) the present invention is best performed using continuous wave (cw) light sources, whereas phase fluorometry requires amplitude modulated or pulsed light sources; 3) phase fluorometry relies on the amplitude modulation of the light source having many frequency components—effected either by varying the frequency of a sinusoidal amplitude modulation or by using short pulses—whereas wavelength modulation spectroscopy is best performed using a single modulation frequency, and relies on optical absorption to introduce multiple amplitude modulation frequencies onto a wavelength-modulated light beam; 4) the present invention provides information about absorption line shapes, whereas phase fluorometry typically uses a fixed wavelength source and acquires no information about spectral profiles.

The following patents likewise do not teach the present invention nor its objects and advantages:

Wong, "Concentration Detector," U.S. Pat. No. 5,047,639 describes an improvement to wavelength modulation spectroscopy which is useful for quantitave detection of a selected gas or gases using a diode laser. Wong describes $2f$ detection for gas concentration determinations. He employs $1f$ detection for line-locking, and describes using the $2f$ signal as a method for guaranteeing "capture" by the $1f$ error signal. However, Wong uses homodyne, not heterodyne demodulations; requires phase adjustments for all demodulations; and cannot acquire line width information.

Whittaker et al., "Method and Apparatus for Reducing Fringe Interference in Laser Spectroscopy," U.S. Pat. No. 5,267,019, also describes an improvement to wavelength (or frequency) modulation spectroscopy for use in detecting gases using diode laser;. Whittaker '019 achieves absorbance measurements with a reduction in unwanted optical interference fringes (etalons) by modulating the laser wavelength at two frequencies simultaneously and by performing sequential demodulations. While unwanted optical interference fringes can occur during practice of the present invention (and can be seen clearly in the phaseless WMS spectra shown in FIGS. 3, 4, and 6), the present invention does not address the fringes, nor would one skilled in the art expect the present invention to maximize or minimize the magnitudes of such fringes. Whittaker '019 is distinct from the present invention because he uses homodyne, not heterodyne demodulations; requires phase adjustments for all demodulations; cannot acquire line width information; and the demodulated lineshapes obtained (Whittaker '019 FIGS. 5–8) are significantly distorted relative to standard harmonic lineshapes, which greatly complicates quantitative measurement of absorbance and species concentrations.

Whittaker et al., "Method and Apparatus for Dual Modulation Laser Spectroscopy," U.S. Pat. No. 5,636,035, also describes an improvement to wavelength (or frequency) modulation spectroscopy for use in detecting gases using diode lasers. Whittaker '035 achieves absorbance measurements and laser line-locking by modulating the laser wavelength at two frequencies simultaneously and by performing two sets of sequential demodulations. Whittaker '035 is distinct from the present invention in that he uses homodyne, not heterodyne demodulations; requires phase adjustments for all demodulations; and cannot acquire line width information.

Zybin et al., "Spectroscopic Method with Double Modulation," U.S. Pat. No. 5,640,245, describes an improvement to optical spectroscopy that is best suited to laser light sources, particularly to diode lasers. He performs a wavelength or amplitude modulation of the laser beam at one frequency, $f_1$, then modulates some optical property of the target species at a second, different frequency, $f_2$. Improved detection limits are possible by demodulating the detector output at the sum frequency, $f_1+f_2$; or at the difference frequency, $f_2-f_1$; or at an integral harmonic of the sum or difference; or by using two demodulators in series with the first demodulator referenced to $f_1$ and the second demodulator referenced to $f_2$. Zybin's invention has relatively few applications, however, because it is usually difficult to find a straightforward method for modulating a useful optical property of the target species. Zybin's approach is most useful for detecting species in AC plasmas since species concentrations often vary synchronously with the plasma frequency. But, other applications listed by Zybin, such as changing the optical path length using "an electrically adjustable system of mirrors," are not feasible at the high frequencies, i.e., above 100 kHz, recommended in the description of the invention and, when implemented, may introduce other error sources such as unwanted optical interference fringes (etalons). More importantly, Zybin does not anticipate the present invention. As with Wong and with the two Whittaker patents, Zybin uses homodyne, not heterodyne demodulations; requires phase adjustments for all demodulations; and cannot acquire line shape information.

Lehmann, "Ring-Down Cavity Spectroscopy Cell Using Continuous Wave Excitation for Trace Species Detection," U.S. Pat. No. 5,528,040, describes a highly sensitive implementation of optical spectroscopy that is useful with diode lasers. His approach differs significantly from the instant invention and from the prior art cited above in that neither wavelength modulation nor frequency modulation techniques are used. Instead, weak optical absorbances are detected by using a special, mirrored optical cell that permits optical path lengths in excess of 1 km from a structure that is only about 1 meter long. Since Lehmann performs direct optical absorbance measurements, his invention can provide line width (and line strength) information, yet nothing in Lehmann's patent discloses or obviates the present invention. Key differences between Lehmann's approach and the present invention include: The present invention does not require a special optical cell, and can be used for open path or in situ measurements; and Lehmann does not require any modulation of laser wavelength nor demodulation of the detector output.

McCaul et al., "Gas Spectroscopy," U.S. Pat. No. 5,491,341, describes an optical spectroscopy technique that is well suited to diode lasers for gas measurements. McCaul's only similarity to the present invention is that both provide line width information. The two approaches are distinct, however, in nearly every other detail. Specifically, McCaul measures the optical transmission through a gas at a plurality—usually five—laser wavelengths that are symmetrically disposed about the absorption peak. These measurements provide the peak absorbance, the line width, and the laser wavelength error. The product of the peak absorbance and line width is proportional to the target gas concentration independent of changes in the line width. The laser wavelength error is used to correct the laser wavelength so that the plurality of measurements remains symmetrically disposed about the absorption peak. Other key differences include: (1) The laser wavelength is not varied continuously, as it is in wavelength modulation or frequency modulation spectroscopies. Instead, a sequence of step changes in laser wavelength is employed to obtain the plurality of measurements. Step durations are on the order of 0.5 ms, corresponding to a change rate of about 2 kHz. In contrast, the present invention employs continuous modulation, typically at frequencies of 50 kHz and higher. (2) One result of using step changes in laser wavelength is that synchronous demodulation (either homodyne or heterodyne) is not possible. Instead, McCaul obtains high detection sensitivity using fast subtraction or fast ratioing circuitry to cancel common mode noise between two photodetectors.

Kenny et al., "Method and System for Examining the Composition of a Fluid or Solid Sample Using Fluorescence and/or Absorption Spectroscopy," U.S. Pat. No. 5,491,344, describes an optical method for measuring species concentrations that is far removed from our application. Most importantly, Kenny uses multiple fixed wavelengths to perform absorption and/or fluorescence spectroscopy. Neither wavelength modulation nor detector demodulation are contemplated. Furthermore, the wavelength spacings are typically four orders of magnitude larger than the line widths of the individual rotational lines probed in typical diode laser spectroscopy. This coarse line spacing makes it impossible to obtain line width information. Other key differences include: (1) Kenny uses laser pulses, not a continuous wave (cw) laser beam, which obviates the type of wavelength modulation employed in the present invention; (2) Kenny does claim absorption spectroscopy using incoherent (i.e., lamp) light sources, but only in conjunction with fluorescence measurements made simultaneously with a pulsed laser system; and (3) Kenny does not use a continuously tunable laser but rather a system that can provide a plurality of fixed wavelengths.

Silver et al., "Laser Absorption Detection Enhancing Apparatus and Method," U.S. Pat. No. 4,934,816, describes a method and apparatus for removing the effects of unwanted optical interference fringes. Such fringes can occur during practice of the present invention (and can be seen clearly in the phaseless WMS spectra shown in FIGS. 3, 4, and 6), but the present invention does not address the fringes, nor would one skilled in the art expect the present invention to maximize or minimize the magnitudes of such fringes. More importantly, nothing in Silver anticipates the phaseless WMS technique. Silver is applicable to a wide variety of laser absorption methods (including the present invention) yet places no constraints on the absorbance method used. Silver invokes wavelength modulation spectroscopy in the preferred embodiment only to the extent that it allows high sensitivity absorption measurements such that unwanted optical interference fringes are significant compared with measured absorbances. Silver does not, however, mention limitations of WMS such as the need for phase adjustment or the lack of line shape information.

Bomse et al., "Mass Spectrometric Apparatus and Method," U.S. Pat. 5,015,848, which is in the field of mass spectrometry, has no relation to the present invention except for presence of a common inventor, but is included for sake of completeness.

SUMMARY OF THE INVENTION (DISCLOSURE OF THE INVENTION)

The present invention is of an improvement to wavelength modulation spectroscopy systems and methods employing modulation means operating at frequency $\Omega$ and a photodetector generating output with frequency components $\Omega$, $2\Omega, \ldots, n\Omega$, where n is an integer greater than one, the improvement comprising a demodulator operating at frequency $\Omega+\delta$, where $\Omega>>\delta$, and additionally recovering signals at a set of frequencies $\Omega+\delta$, $2\Omega+2\delta$, $n\Omega+n\delta$. In the preferred embodiment, the demodulator comprises an oscillator generating pulses at frequency $\Omega+\delta$ sufficiently narrow in time to recover signals at $n\Omega+n\delta$ and generates signal output containing signals $\delta$, $2\delta$, $\ldots$, $n\delta$. Absorption line shapes are generated from the signal output. The signal output can reflect uniform contributions from each of the signals $\delta$, $2\delta$, $\ldots$, $n\delta$, or by use of a multiplier have contributions of each of the signals $\delta$, $2\delta$, $\ldots$, $n\delta$ be adjusted separately. The invention operates without regard to relative phases of the wavelength modulation frequency and the operating frequency of the demodulator. Output of the demodulator can be digitized at audio frequencies. A phase lock loop may be employed to compare and correct frequency differences between the modulation means and the demodulator. Active stabilization (line locking) of the laser wavelength may also be employed.

The primary objects and advantages of the present invention are:

1. Measurements provide information on multiple detection harmonics simultaneously which makes it possible to acquire absorber line shape information, which is vital for maintaining accuracy in absorbance measurements for systems in which the sample pressure, temperature, and/or composition may vary.

2. No phase adjustment is needed whereas in most wavelength modulation and frequency modulation systems a phased demodulation is required to obtain accurate absorbance measurements, but phase settings may drift in time.

3. The present invention uses a heterodyne, not a homodyne demodulation (demodulation frequency differs from the modulation frequency and all of its harmonics), the former approach retaining the low-noise advantages of conventional wavelength modulation spectroscopy while permitting data acquisition (and analysis) using relatively inexpensive, low frequency electronic components.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 6 shows changes in phaseless WMS linewidths of 5 torr of water vapor as a function of added room air.

DESCRIPTION OF THE PREFERRED EMBODIMENTS

(BEST MODES FOR CARRYING OUT THE INVENTION)

In wavelength modulation spectroscopy, the spectral waveforms generated from the various wavelength modulation harmonics —$\Omega$, $2\Omega$, $3\Omega$, $4\Omega$, etc. —look like the corresponding derivatives of the absorption line. The present invention acquires the complete (or nearly complete) absorption line by combining information from the various harmonics in much the same way that a Taylor series expansion allows a function to be evaluated over a certain range by evaluating the function's derivatives within that range. By constructing the true absorption line shape (or, a significant part of it), the integrated absorbance can be obtained which gives the target species concentration accurately and independent of linewidth variations. In contrast, the conventional approach to WMS, in which the AC signal at one modulation harmonic, $n\Omega$, is isolated and demodulated, throws away considerable information by rejecting AC signal components at other harmonics of $\Omega$. The apparatus and method of the present invention do not require a fixed phase between the detector output and the demodulation waveform; this improves long term measurement stability by avoiding phase drift in the demodulation step and electronics. Another key advantage is that the demodulation step is performed at high frequency, where laser noise is unimportant, while the data collection step is performed at low frequencies which permits the use of inexpensive digitizing and signal processing electronics.

Figure 1:
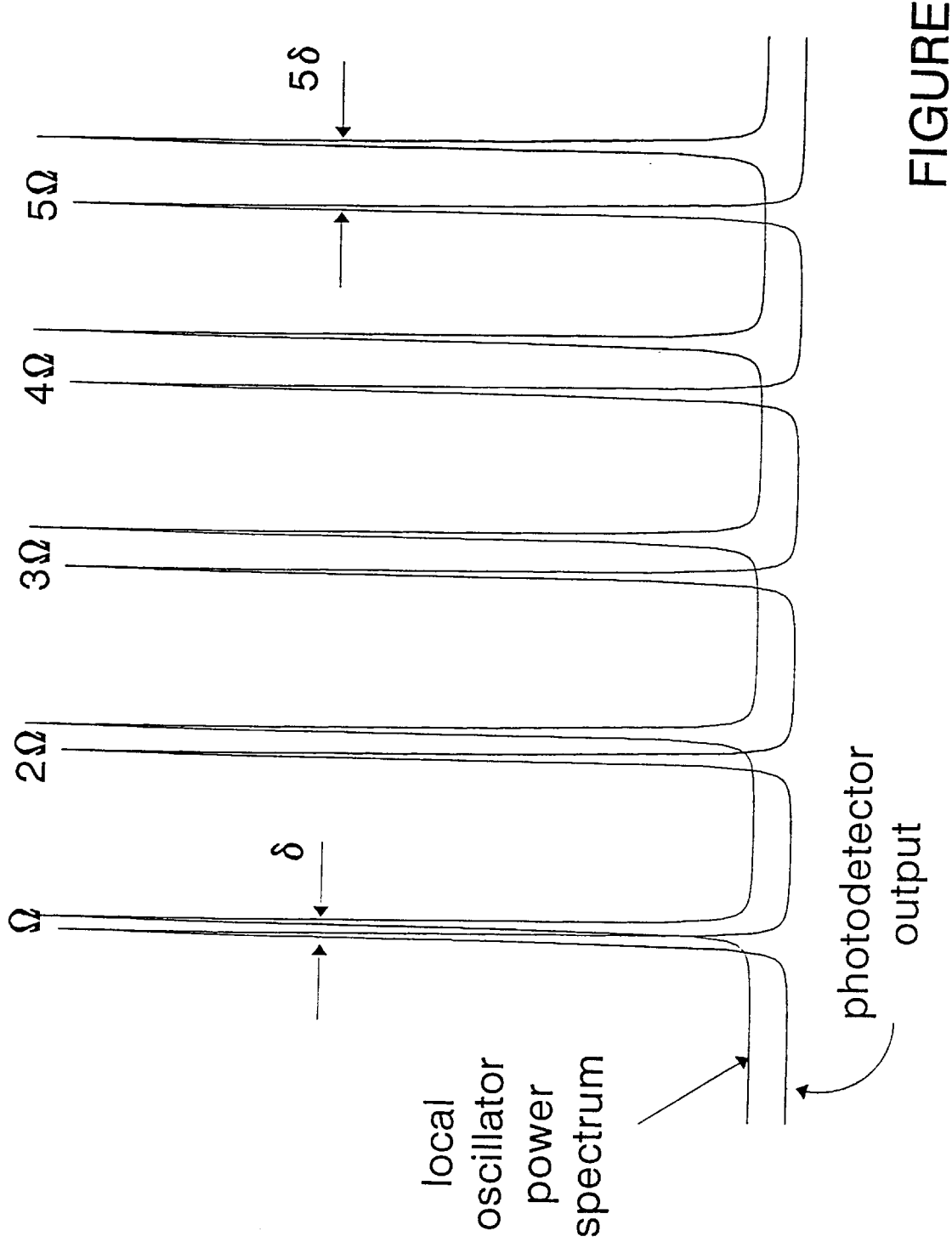
FIG. 1 shows power spectra pertinent to phaseless wavelength modulation spectroscopy of the invention.

FIG. 1 demonstrates a key concept behind the invention. If the photodetector output contains frequency components at $\Omega$, $2\Omega$, $3\Omega$, $4\Omega$, etc., and if the detector is demodulated using a local oscillator containing components at frequencies $\Omega+\delta$, $2\Omega+2\delta$, $3\Omega+3\delta$, $4\Omega+4\delta$, etc. (where $\Omega>>\delta$), then the demodulated output will have components at frequencies $\delta$, $2\delta$, $3\delta$, $4\delta$, etc. There is a one-to-one correspondence between the information contained in the detector output at frequency $n\Omega$ and the low frequency signal obtained at frequency $n\delta$. The relatively low frequency signals obtained by collecting the demodulated components at $\delta$, $2\delta$, $3\delta$, $4\delta$, etc., provide the Fourier components needed to construct the true absorption line shape.

The requisite local oscillator waveform is generated by using narrow pulses at frequency $\Omega+\delta$. The width of the pulses controls the number of Fourier components included, that is, the largest value of $n(\Omega+\delta)$. Since the pulsed local oscillator is at a slightly different frequency than the wavelength modulation frequency, their relative phases are unimportant, and the resulting WMS detection method of the invention does not require phase control and does not suffer from phase drift.

Figure 2:
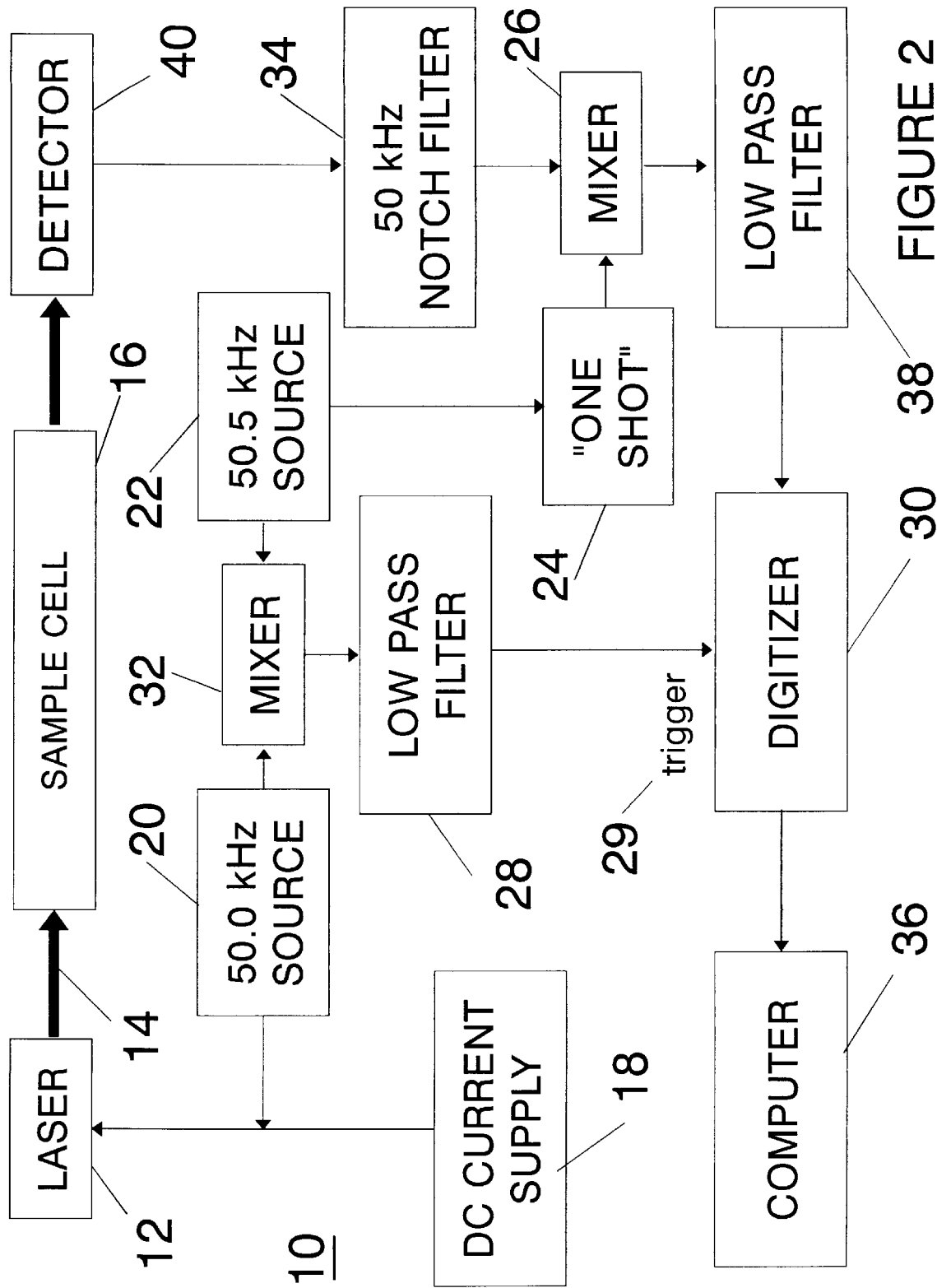
FIG. 2 is a schematic diagram of the preferred apparatus of the invention.

FIG. 2 is a schematic diagram of the preferred apparatus 10 of the invention. One may acquire phaseless wavelength modulation spectra of water vapor using a laser 12, such as a near-infrared DFB diode laser (e.g. operating at 1305 nm).

The laser, such as a Fujistu FLD130F2KP/057 laser, is coupled to connector (e.g. a single mode output fiber 14 or like connector) which, in turn, is connected directly to the input of detector (e.g. a Herriott multiple pass optical cell 16 or like unit). This arrangement provides the long optical paths (e.g 24 m) needed to observe the weak water absorption and excludes air from the optical path so that the signals are free of contributions due to water vapor in air at atmospheric pressure. The laser temperature and DC current are regulated, preferably by a controller (e.g. an ILX 3722 diode laser controller 18 or the like). The laser wavelength is modulated by applying a sine wave output at e.g. 50 kHz 20 from waveform generator (a Stanford Research 545 waveform generator or the like) to the AC input on the controller.

The demodulation waveform is produced by using a wave output (e.g. TTL-level square wave) from a waveform generator (e.g. Stanford Research 340 waveform generator or the like at preferably 50.5 kHz 22 as the input to a monostable (e.g., 74HC123 "one shot") integrated circuit 24. The circuit containing the IC uses, for example, a fixed 100 pF capacitor and a 100 kOhm potentiometer to produce output pulses adjustable from 0.5 to 10 $\mu s$ duration. Output from the monostable is current amplified using an operational amplifier (e.g. an LH0002 operational amplifier or the like) to make the pulses compatible with the input (e.g. 50 Ohm) to the mixer 26.

A synchronization pulse (e.g. 500 Hz)—used to trigger 29 the digitizer 30 and an oscilloscope (not shown)—is prepared by mixing 32 the reference waveforms (preferably TTL) from the two function generators 20 and 22, passing the IF output through an active low pass filter 28 e.g. 6.25 kHz (TTE, Inc.), then amplifying and DC-shifting the resulting signal using a pair of operational amplifiers (not shown), before applying the resulting signal to a fast comparator (not shown) (e.g. LT1016). The comparator removes false triggers due to ringing at the edges of the TTL reference square wave signals.

Laser light is detected by a photodiode 40 (e.g. 3-mm-diameter InGaAs photodiode or the like, not shown) (e.g. Epitaxx ETX-3000T) cemented into one of the optical cells. The photodiode is biased (e.g. at 1.5 V with a D-cell battery) and output from the detector is terminated (e.g. at either 1 kOhm or 50 Ohm, depending on the type of measurement being made). For direct absorption measurements, for example the 1 kOhm termination is useful, and the photodiode signal is voltage amplified using a preamplifier (e.g. Stanford Research SR560 preamplifier or the like, not shown) and is then digitized using a digitizer (e.g. 12-bit, 200 kHz digitizer or the like) (e.g. Analog Devices RTI-860) that plugs into a personal computer bus 36. Phaseless WM spectra are obtained by first amplifying the detector output using a commercial AC-coupled, RF amplifier (or the like, not shown) (e.g. Mini-Circuits ZFL-500) having a low pass cutoff (e.g. 50 kHz) and bandwidth (e.g. 500 MHZ), then filtering the amplified signal using a notch filter 34 (e.g. 50 kHz) to remove the $1\Omega$ frequency component before applying the resulting AC waveform to the RF input of a double-balanced mixer 26 (or the like) (e.g. Mini-Circuits MC2–3). The IF output from the mixer is further amplified and low-pass filtered by the preamplifier 38 before being digitized.

The notch filter (50 kHz) removes the large laser amplitude modulation (AM) that occurs synchronously with wavelength modulation. From a Fourier analysis point of view, removing the $1\Omega$) frequency component is equivalent to removing the DC signal level (base band) of the resulting demodulated waveform.

Figure 3:
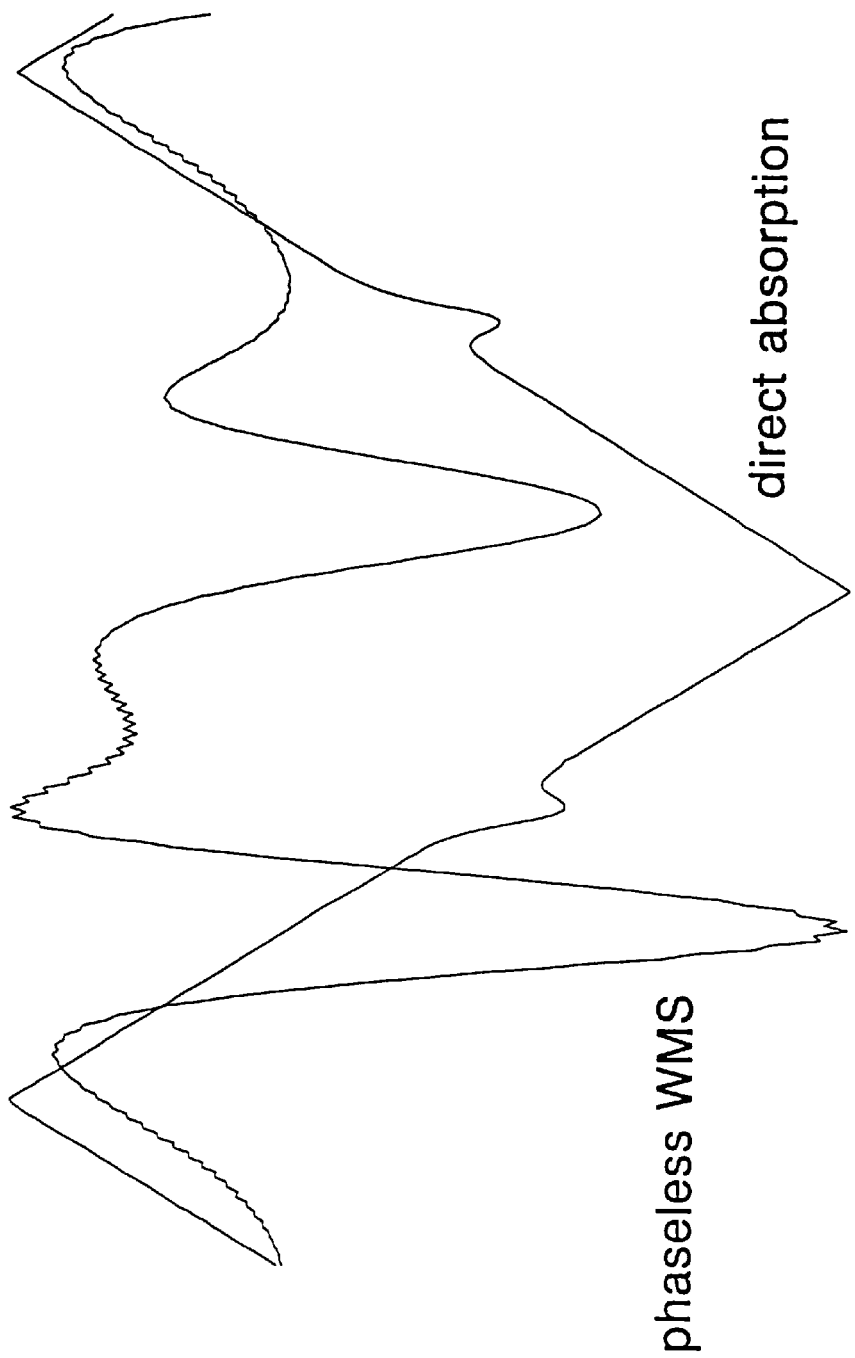
FIG. 3 compares a direct absorption spectrum (triangle ramp) with a phaseless wavelength modulation spectrum of 5 torr of water vapor.

FIG. 3 shows a direct absorption spectrum—the triangle waveform—of 5 torr of water vapor in the optical cell and a phaseless wavelength modulation spectrum of the same sample. The direct absorption spectrum is obtained by ramping the laser current relatively slowly (e.g. 100 Hz) with a triangle ramp while digitizing the photodiode output. The absorption line due to water is clearly visible near the center of both the upward and downward portions of the direct absorption trace. The phaseless WM spectrum also shows two features corresponding to the laser wavelength traversing the absorption line during the two half-cycles of the modulation waveform. Non-linearities in the laser current response are responsible for the lack of symmetry between the two peaks. Nevertheless, the trace clearly shows features that resemble the true absorption line shape instead of the harmonic waveforms generated by standard WMS.

Figure 4:
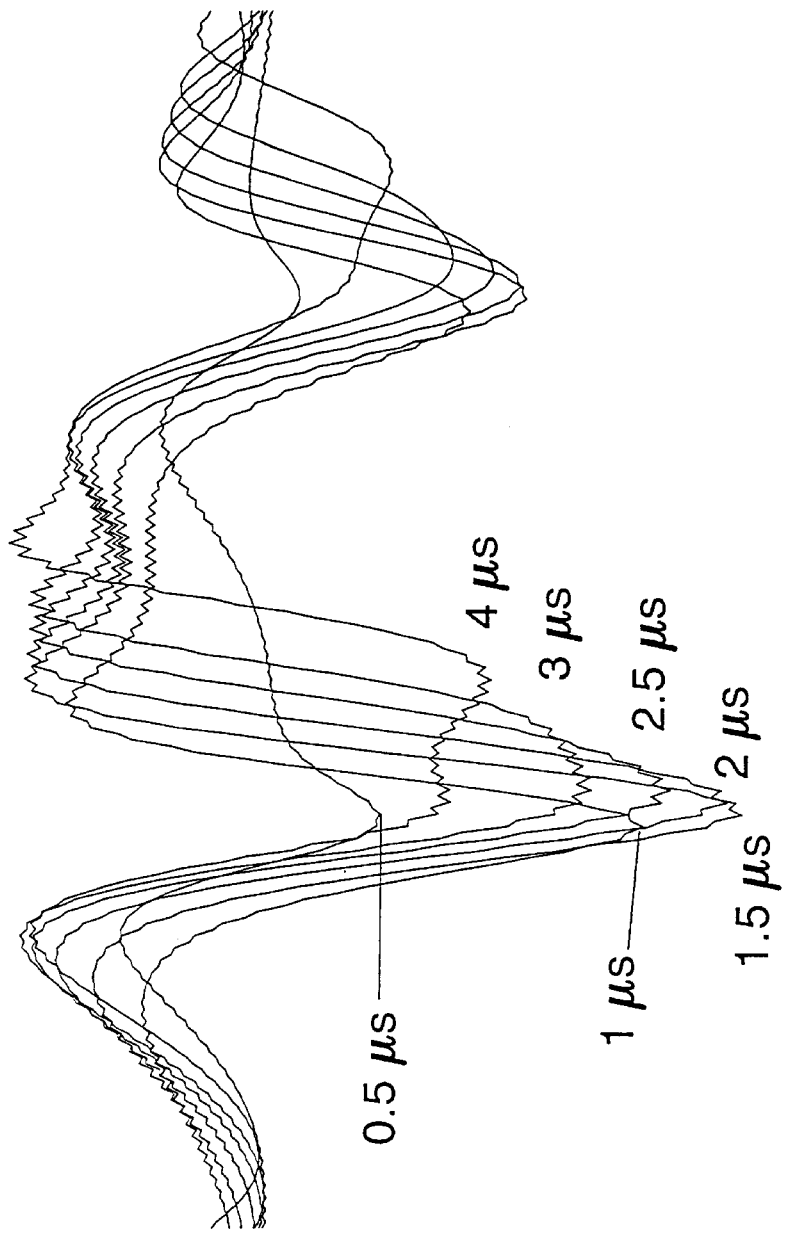
FIG. 4 illustrates dependence of phaseless wavelength modulation spectra with changing demodulation pulse width.

The shape of the phaseless WMS signal is dictated, in part, by the number of demodulation frequencies (values of $n[\Omega+\delta]$) applied to the mixer. Narrowing the demodulation pulses increases the number of frequencies at the expense of a reduced duty factor. FIG. 4 shows a set of phaseless WM spectra obtained for seven values of the demodulation pulse width ranging from 4 $\mu$s down to 0.5 $\mu$s. Again, the laser is probing a 5 torr sample of water vapor. The widest pulses lead to broad WMS signals; reducing the gate width sharpens the WMS features, with little observed distinction among the spectra obtained for 1.0, 1.5, and 2.0 $\mu$s. The poor quality of the 0.5 $\mu$s trace is due, it is believed, to a paucity of low frequency components comprising the narrowest pulses. A 2.0 $\mu$s demodulation pulse width represents an 80% reduction in duty factor compared with standard WMS signal processing for 50 kHz modulation.

Note an advantage of the present invention: because double-balanced mixers act like synchronous diode-driven switches, the local oscillator input saturates for signals $\geq 1.5$ V. All local oscillator frequency components that are amplified to at least 1.5 V contribute equally to the demodulation of the photodiode signal. As a result, it is possible to get uniform contributions from a series of demodulation frequencies, $n(\Omega+\delta)$.

Figure 5:
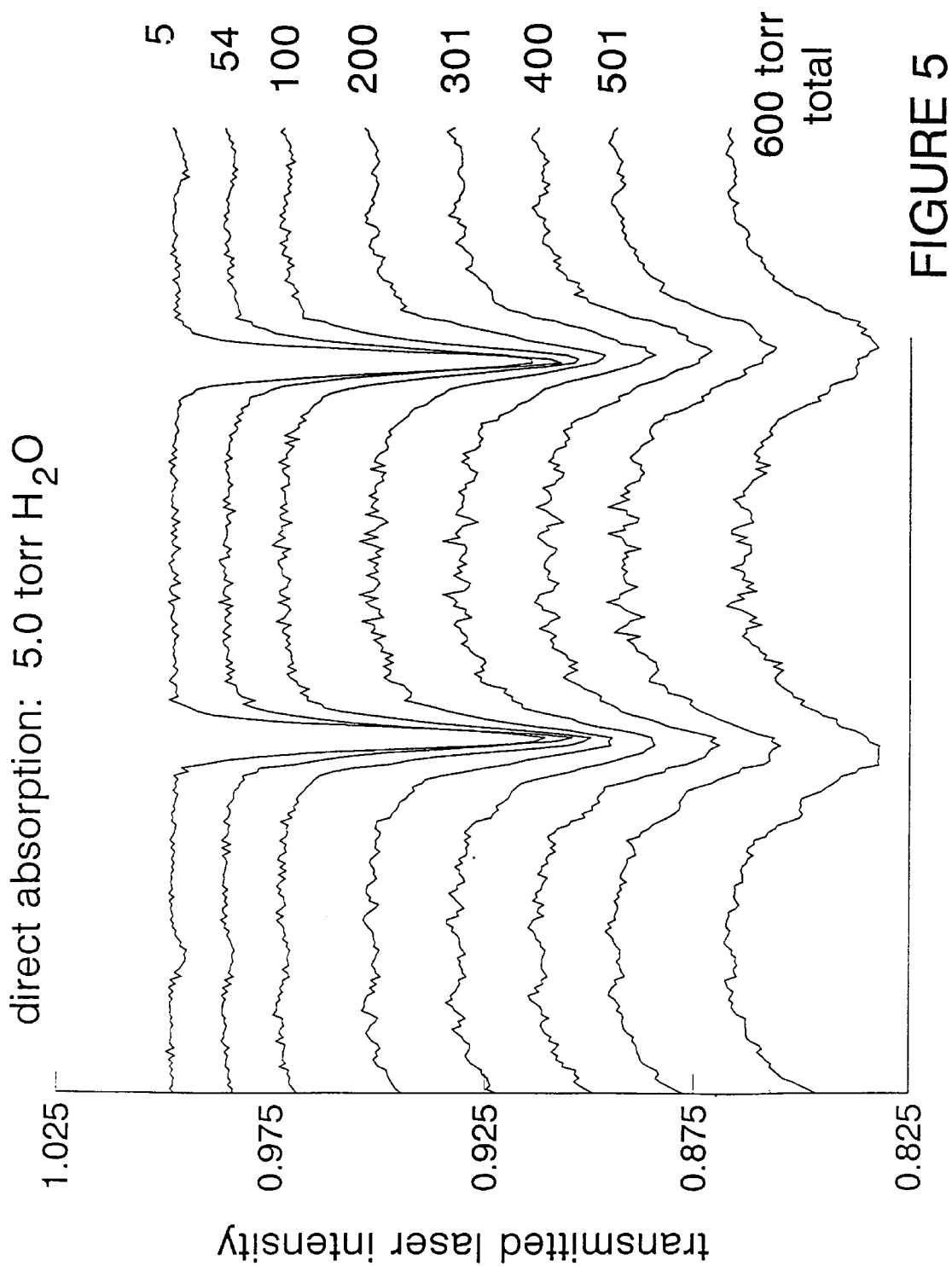
FIG. 5 shows direct absorption spectra of 5 torr water vapor as a function of added room air, with traces offset for clarity.

FIGS. 5 and 6 show the effects of collisional line broadening as air is added to the optical cell. Direct absorption spectra are present in FIG. 5; these data were collected using slow (e.g 100 Hz) triangle ramp scans, similar to the first trace in FIG. 1, but the spectrum of an empty cell was subtracted digitally to improve clarity. FIG. 6 shows the corresponding phaseless WM spectra. The WMS lines also broaden, as expected, although a slow shift in line center position (presumed caused by a small amount of laser wavelength drift) makes it difficult to overlay sequential traces.

The present invention permits acquiring wavelength modulation spectra without phase control while also obtaining line shape information. Other advantages include:

1. Because isolated absorption lines typically have a well-defined functional form (Doppler, Lorentz, or Voigt shapes depending on the pressure range), information from only a few Fourier components (harmonics of $\Omega$) is needed in order to characterize the linewidth. Phaseless WMS data, such as the traces in FIGS. 2 and 4, can be Fourier transformed and a least square analysis used to fit the resulting power spectrum to a linewidth and absorption strength.

2. Digitization of the phaseless WMS traces may be performed at audio frequencies (i.e., approximately 44 kHz or lower). Even slower rates are possible by picking smaller values of $\delta$ without loss of detection sensitivity. Therefore, the digitization and signal analysis can be performed using extremely low cost digital signal processing (DSP) hardware.

3. Lowered digitization rates and commercial DSP hardware permits adding digital filtering methods to improve signal-to-noise ratios. Implementing digital filters is straightforward because, as noted above, the functional form of the absorption line shapes is typically known.

4. It is preferred to employ two highly stable function generators to provide the modulation and demodulation waveforms. However, one may use low cost waveform sources, such as simple fixed-frequency TTL oscillator and a voltage controlled oscillator, by including a phase lock loop to compare and correct the frequency difference between the two oscillators. This Improvement reduces dramatically the cost of implementing the present invention.

5. Standard laser "line locking " schemes (see, e.g., discussion in U.S. Pat. No. 5,047,639, to Wong) are compatible with the modulation scheme required for phaseless WMS and can be implemented easily and inexpensively with the present invention to provide active stabilization of the laser wave length (see changes in WMS peak positions, FIG. 5, caused by laser wavelength drift). Line locking is becoming a standard feature of diode-laser-based instruments.

6. The present invention is also useful for measurements in which the target absorption line is partially overlapped by one or more lines due to background species, or in which the laser can be modulated over a sufficiently large wavelength range to encompass more than one absorption line of interest. One can recover absorption features of multiple peaks having different linewidths using a single optical beam. This is important for applications where it is necessary to detect several gases simultaneously and where new, multi-section, distributed Bragg reflector (DBR) lapsers offer the potential for large tuning and wavelength modulation ranges.

7. The invention is also useful for analyzing wavelength modulation spectra of lines that are much broader than the wavelength modulation range of the laser. Collecting information from multiple harmonics permits fitting a small portion of the absorption feature—such as the region around line center—particularly if the functional form of the feature has been determined previously. Potential applications include detecting gases at high pressures and making measurements of liquids.

8. Laser wavelength modulation can also be combined with a relatively slow ramping of the average (unmodulated) laser wavelength while the detector signal is processed using multiple harmonic phaseless detection. This produces a spectral waveform in which the absorber lineshape is not convoluted with the modulation function, but, instead, shows a more linear wavelength scale.

9. Demodulation can be performed using an analog or digital multiplier instead of a diode mixer. This approach has the advantage of allowing a customized local oscillator in which the magnitudes of the individual Fourier components are adjusted separately. Both unipolar and bipolar local oscillators may be employed.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. In a wavelength modulation spectroscopy system comprising modulation means operating at frequency $\Omega$ and a photodetector generating output with frequency components $\Omega, 2\Omega, \ldots, n\Omega$, where n is an integer greater than one, an improvement comprising a demodulator operating at frequency $\Omega+\delta$, where $\Omega\gg\delta$, and additionally recovering signals at frequencies $\Omega+\delta, 2\Omega+2\delta, n\Omega+n\delta$, wherein $\delta$ is a nonzero number.

2. The improved system of claim 1 wherein said demodulator comprises an oscillator generating pulses at frequency $\Omega+\delta$ sufficiently narrow in time to recover signals at $n\Omega+n\delta$.

3. The improved system of claim 1 wherein said demodulator comprises means for generating signal output containing signals $\delta, 2\delta, \ldots, n\delta$.

4. The improved system of claim 3 additionally comprising means for generating an absorption line shape from said signal output.

5. The improved system of claim 4 wherein said generating means comprises Fourier transform means.

6. The improved system of claim 3 wherein said signal output reflects uniform contributions from each of said signals $\delta, 2\delta, \ldots, n\delta$.

7. The improved system of claim 3 wherein said demodulator comprises a multiplier permitting contributions of each of said signals $\delta, 2\delta, \ldots, n\delta$ to be adjusted separately.

8. The improved system of claim 1 wherein said improvement operates without regard to relative phases of the wavelength modulation frequency and said operating frequency of said demodulator.

9. The improved system of claim 1 additionally comprising means for digitizing output of said demodulator at audio frequencies.

10. The improved system of claim 1 additionally comprising a phase lock loop means to compare and correct frequency differences between the modulation means and said demodulator.

11. The improved system of claim 1 additionally comprising means for active stabilization of a light source wavelength.

12. In a wavelength modulation spectroscopy method comprising the steps of modulating at frequency $\Omega$ and generating photodetector output with frequency components $\Omega, 2\Omega, \ldots, n\Omega$, where n is an integer greater than one, an improvement comprising the steps of demodulating at frequency $\Omega+\delta$, where $\Omega\gg\delta$, and recovering signals at frequencies $\Omega+\delta, 2\Omega+2\delta, n\Omega+\delta$, wherein $\delta$ is a nonzero number.

13. The improved method of claim 12 wherein the demodulating step comprises by oscillator generating pulses at frequency $\Omega+\delta$ sufficiently narrow in time to recover signals at $n\Omega+n\delta$.

14. The improved method of claim 12 wherein the recovering step comprises means for generating signal output containing signals $\delta, 2\delta, \ldots, n\delta$.

15. The improved method of claim 14 additionally comprising the step of generating an absorption line shape from the signal output.

16. The improved method of claim 15 wherein the generating step comprises applying a Fourier transform.

17. The improved method of claim 15 wherein the generating step comprises producing signal output reflecting uniform contributions from each of the signals $\delta, 2\delta, \ldots, n\delta$.

18. The improved method of claim 15 wherein the demodulating step comprises employing a multiplier permitting contributions of each of the signals $\delta, 2\delta, \ldots, n\delta$ to be adjusted separately.

19. The improved method of claim 12 wherein the improved method operates without regard to relative phases of the modulation frequency and the demodulation frequency.

20. The improved method of claim 12 additionally comprising the step of digitizing the signals at audio frequencies.

21. The improved method of claim 12 additionally comprising the step of employing a phase lock loop means to compare and correct frequency differences between the modulation frequency and the demodulation frequency.

22. The improved method of claim 12 additionally comprising the step of providing means for active stabilization of a light source wavelength.

* * * * *